US012590018B1

(12) United States Patent　(10) Patent No.: US 12,590,018 B1

Omran et al.　(45) Date of Patent:　Mar. 31, 2026

(54) NANOCOMPOSITE FOR WASTEWATER TREATMENT

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/210,575

(22) Filed: May 16, 2025

(51) Int. Cl.

| | |
|---|---|
| *C02F 1/28* | (2023.01) |
| *B01J 2/28* | (2006.01) |
| *B01J 20/06* | (2006.01) |
| *B01J 20/10* | (2006.01) |
| *B01J 20/28* | (2006.01) |
| *B01J 20/30* | (2006.01) |
| *C02F 101/10* | (2006.01) |
| *C02F 101/30* | (2006.01) |

(52) U.S. Cl.
CPC .............. *C02F 1/288* (2013.01); *B01J 20/06* (2013.01); *B01J 20/10* (2013.01); *B01J 20/28007* (2013.01); *B01J 20/28019* (2013.01); *B01J 20/28059* (2013.01); *B01J 20/28061* (2013.01); *B01J 20/28073* (2013.01); *B01J 20/28083* (2013.01); *B01J 20/2809* (2013.01); *B01J 20/3078* (2013.01);

*C02F 1/281* (2013.01); *C02F 1/283* (2013.01); *C02F 2101/108* (2013.01); *C02F 2101/30* (2013.01); *C02F 2305/08* (2013.01)

(58) Field of Classification Search
None
See application file for complete search history.

(56) References Cited

FOREIGN PATENT DOCUMENTS

| | | | |
|---|---|---|---|
| CN | 107855106 A | 3/2018 | |
| CN | 109663590 A | 4/2019 | |
| CN | 116747902 A | * 9/2023 | ............... C02F 1/30 |
| CN | 118807812 A | * 10/2024 | ............... C02F 1/36 |

OTHER PUBLICATIONS

Yao et al. (Materials Research Bulletin, 2017, 86, 186-193). (Year: 2017).*

Castro et al. (Optik, 2024, 300, 171682). (Year: 2024).*

(Continued)

*Primary Examiner* — Clare M Perrin

(74) *Attorney, Agent, or Firm* — Oblon, McClelland, Maier & Neustadt, L.L.P.

(57)　　　　ABSTRACT

A method of immobilizing contaminants disposed in an aqueous medium comprising contacting the aqueous medium with a particulate crystalline nanocomposite for a sufficient contact time to permit adsorption of the contaminants. The particulate crystalline nanocomposite includes: a tetragonal ($CaMoO_4$) crystalline phase; a ($CaSiO_3$) crystalline phase; and, a graphitic-($C_3N_4$) crystalline phase, wherein at least a fraction of the graphitic-$C_3N_4$ is in the form of mesoporous nanosheets.

19 Claims, 9 Drawing Sheets

(56) References Cited

OTHER PUBLICATIONS

Ernawati et al. (IOP Conf. Ser.: Earth Environ. Sci., 2022, 963, 012008). (Year: 2022).*

Chan et al. (Ceramics International, 2020, 46, 22624-22634). (Year: 2020).*

Machine translation of CN-116747902-A, pp. 1-7. (Year: 2023).*

Valenzuela et al. (J. Chil. Chem. Soc., 2013, 58, 1744-1749). (Year: 2013).*

L Ernawati, et al., "Effect of CaO/SiO2 compositions on the structure formation of mesoporous calcium silicate (CaSiO3) composite particles as adsorbent for organic dye removal", IOP Conference Series: Earth and Environmental Science, vol. 963, 2022, 012008, 11 pages.

Guangyuan Yao, et al., "Synthesis and enhanced visible-light photocatalytic activity of wollastonite/g-C3N4 composite", Materials Research Bulletin, vol. 86, Feb. 2017, pp. 186-193, Excerpts only, 5 pages.

M.A.M. Castro, et al., "Improvement of dye degradation by photocatalysis and synergistic effect of sonophotocatalysis processes using CaMoO4/g-C3N4 heterojunction", Optik, vol. 300, Apr. 2024, 171682, Excerpts only, 5 pages.

* cited by examiner

NANOCOMPOSITE FOR WASTEWATER TREATMENT

BACKGROUND

Technical Field

The present disclosure is directed towards a method of immobilizing contaminants disposed in an aqueous medium through adsorption onto a $CaMoO_4/CaSiO_3/g-C_3N_4$ particulate nanocomposite material. The present disclosure is further directed to a method of treatment of wastewater using the particulate crystalline nanocomposite and to a method of preparation of the nanocomposite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Surging industrialization and urban expansion have intensified the release of waste inorganic and organic pollutants into the environment, overwhelming natural purification processes and endangering environmental health. As these contaminants infiltrate water and soil systems, they disrupt ecological balance and pose significant risks to human well-being. Heavy metal ions, such as cadmium (Cd), chromium (Cr), copper (Cu), iron (Fe), lead (Pb), zinc (Zn), and uranium (U), are particularly concerning due to their toxicity, carcinogenicity, and non-biodegradability. Industries such as chemicals, textiles, plastics, mining, and paper contribute significantly to heavy metal pollution, with untreated discharge endangering aquatic ecosystems and becoming hazardous at high concentrations. Addressing these challenges requires innovative treatment technologies capable of effectively removing and, where possible, degrading pollutants into harmless constituents, ensuring sustainable water management.

Traditional processes such as coagulation, clarification, filtration, and sterilization primarily target suspended solids and microbial contaminants but demonstrate limited efficiency in eliminating dissolved inorganic species, dissolved organic matter and organic matter in colloidal suspension. These limitations restrict the applicability of the known processes in treating highly contaminated wastewater. To overcome this challenge, nanocomposite-based immobilization techniques integrate adsorption, catalytic degradation, and ion exchange mechanisms, effectively capturing and neutralizing persistent contaminants. By incorporating nanomaterials with a high surface area and tailored functional properties, such an approach improves pollutant retention, promotes the breakdown of organic pollutants, and can enhance desalination efficiency. Further photocatalytically active nanocomposites has emerged as sustainable remediative materials, leveraging light-driven reactions to degrade contaminants into harmless by-products, and offering a cost-effective and eco-friendly solution for water purification.

Sunlight-driven semiconductor photocatalytic technology is widely applied in advanced wastewater treatment and reuse. However, continuous illumination is essential for photocatalysis, given that a lack of light halts electron-hole pair generation, ceasing activity. Since sunlight cannot be stored, solar-driven photocatalysis may become ineffective in the absence of light. To mitigate this challenge, advancements in photocatalyst design, such as heterojunction formation, doping, and surface modification, have been explored to enhance charge separation, extend light absorption, and improve stability, ensuring more reliable and prolonged photocatalytic activity. Despite significant advancements, challenges persist, including limited visible-light absorption, low efficiency, and poor stability. It is considered that future research should focus on enhancing light absorption, charge separation, and catalyst durability. Moreover, synthesizing nanocomposites can pose challenges due to the high-temperature requirements of synthetic processes and lengthy processing times; moreover, the obtained nanocomposites are often characterized by irregular particle sizes or morphology. Additionally, several techniques often result in inconsistent porosity affecting the overall performance of such nanocomposites in adsorption.

Currently, efforts are being made to develop efficient, reproducible synthesis methods for mixed metal oxide-based nanocomposites. Moreover, it is recognized that carbon-based nanoparticles, with their high surface area, conductivity, and stability, offer a promising alternative to metal oxide-based nanocomposites. However, it is conceived that incorporating electroactive species, such as graphene, into nanocomposite metal materials may further improve performance, making the resultant nanocomposite materials highly effective for photocatalysis and sustainable pollutant degradation. There is, however, considered to remain a need in the art to mitigate for the limited visible-light absorption, low catalytic efficiency and poor stability of such nanocomposite materials, and for the rapid recombination of photogenerated carriers therein. Future research should focus on improving light absorption, enhancing carrier separation, and developing durable, eco-friendly catalysts for sustained pollutant degradation.

Accordingly, one object of the present disclosure is to provide a method of immobilizing contaminants using a particulate crystalline nanocomposite and to provide a facile method of preparing such a particulate crystalline nanocomposite, which nanocomposite may circumvent the drawbacks and limitations, such as poor stability, inconsistent porosity, limited reusability, and low degradation efficiency, of the methods and materials already known in the art.

SUMMARY

In an exemplary embodiment, a method of immobilizing contaminants disposed in an aqueous medium is described. The method comprises contacting the aqueous medium with a particulate crystalline nanocomposite for a sufficient contact time to permit adsorption of the contaminants. The particulate crystalline nanocomposite comprises, as determinable by X-Ray Diffraction: a tetragonal calcium molybdate ($CaMoO_4$) crystalline phase; a calcium silicate ($CaSiO_3$) crystalline phase; and, a graphitic carbon nitride ($g-C_3N_4$) crystalline phase, wherein at least a fraction of the graphitic-$C_3N_4$ is in the form of mesoporous nanosheets.

In some embodiments, the contaminants comprise organic contaminants selected from the group consisting of: polyaromatic hydrocarbons and their halogenated derivatives; phenols and their halogenated derivatives; furanes and their halogenated derivatives; dioxines and their halogenated derivatives; biphenyls and their halogenated derivatives; and, organic dyes.

In some embodiments, the contaminants include inorganic contaminants selected from the group consisting of: radioactive nuclides; toxic metals; heavy metals; and, metalloids.

In some embodiments, the ratio by weight of $CaMoO_4$ to $CaSiO_3$ to graphitic-$C_3N_4$ in the particulate crystalline nanocomposite is about (0.8-1.2):(0.8-1.2):(0.8-1.2).

In some embodiments, at least a fraction of the $CaMoO_4$ and at least a fraction of the $CaSiO_3$ of the particulate crystalline nanocomposite are in the form of substantially spherical particles.

In some embodiments, at least 50 weight percent (wt. %) of the $CaMoO_4$ of the particulate crystalline nanocomposite is in the form of substantially spherical particles, and at least 50 wt. % of the $CaSiO_3$ of the particulate crystalline nanocomposite is in the form of substantially spherical particles.

In some embodiments, the substantially spherical particles have a median volume particle size (Dv50) of from about 5 to about 20 nm, as determined by scanning electron microscopy (SEM).

In some embodiments, at least 80 wt. % of the graphitic-$C_3N_4$ is in the form of mesoporous nanosheets.

In some embodiments, the particulate crystalline nanocomposite has a monomodal pore size distribution, as determined by Barrett-Joyner-Halenda (BJH) desorption analysis.

In some embodiments, the particulate crystalline nanocomposite has an average pore diameter of from about 15 nm to about 25 nm, as determined by BJH desorption analysis.

In some embodiments, the particulate crystalline nanocomposite has an average pore diameter of from about 15 nm to about 20 nm, as determined by BJH desorption analysis.

In some embodiments, the particulate crystalline nanocomposite has a surface area of from about 60 to about 100 $m^2/g$, as determined by Brunauer-Emmett-Teller (BET) analysis.

In some embodiments, the particulate crystalline nanocomposite has a surface area of from about 70 $m^2/g$ to about 90 $m^2/g$, as determined by BET analysis.

In some embodiments, the particulate crystalline nanocomposite has a pore volume of from about 0.1 to about 0.5 $cm^3/g$, as determined by BJH desorption analysis.

In another exemplary embodiment, a method of preparing the particulate crystalline nanocomposite is described. The method further comprises preparing the particulate crystalline nanocomposite by: forming a solution of a calcium (Ca) salt and an alkali metal silicate in a solvent comprising water and a $C_1$-$C_4$ alkanol; heating the solution at a temperature of from about 150 degree Celsius (° C.) to about 250° C. to form a dry product of $CaSiO_3$; forming graphitic-$C_3N_4$ by heating urea in a closed vessel at a temperature of about 500° C. to about 700° C.; forming an acidified solution in a polar protic solvent of a molybdenum salt and a reducing sugar; heating the acidified solution at a temperature of from about 150° C. to about 250° C. for a sufficient duration to carbonize the reducing sugar to form a carbonized product; comminuting the carbonized product of the heating stage, calcining the comminuted carbonized product at a temperature of from about 500° C. to about 1200° C. for a duration of from about 1 hour to about 5 hours to form $MoO_3$; dispersing the $CaSiO_3$, graphitic-$C_3N_4$ and $MoO_3$ in a polar protic solvent and heating the dispersion at a temperature of from about 150° C. to about 250° C. at a pressure of from about 2 Bar to about 8 Bar; and, separating the solid particulate crystalline nanocomposite from the heated dispersion.

In some embodiments, the contact time is from about 1 to about 120 minutes.

In some embodiments, the contact time is from about 5 minutes to about 30 minutes.

In some embodiments, a fixed volume of the aqueous medium is provided in which the particulate crystalline nanocomposite is dispersed.

In some embodiments, a flow of the aqueous medium contacts a membrane in which the particulate crystalline nanocomposite is disposed.

In some embodiments, the particulate crystalline nanocomposite is provided in an amount of from about 0.1 grams per liter (g/L) to about 5 g/L of the aqueous medium.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
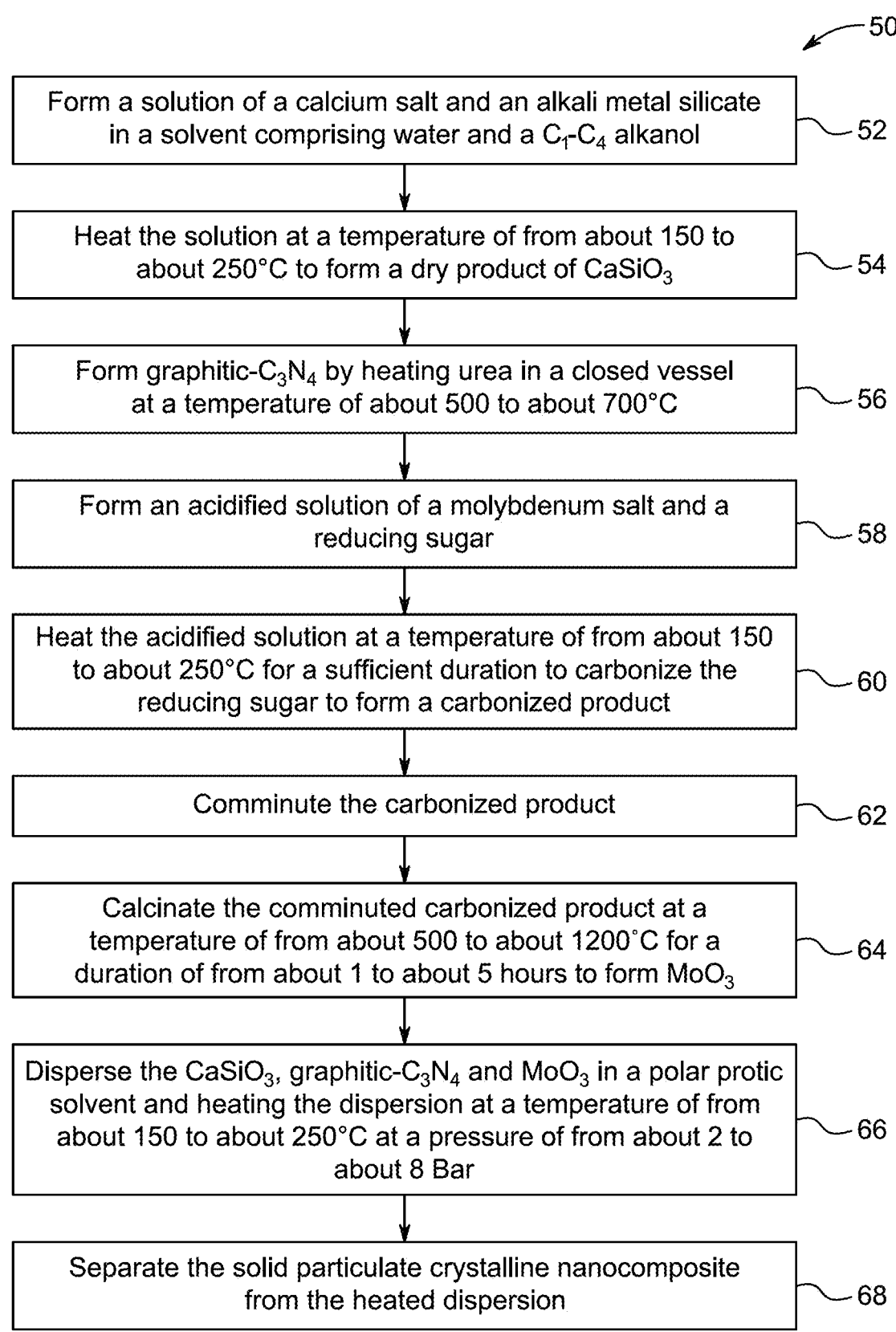
FIG. 1 illustrates an exemplary flow chart for a method of producing a particulate crystalline $CaMoO_4/CaSiO_3/g$-$C_3N_4$ nanocomposite, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" refers to a temperature range of 23 degrees Celsius (° C.)±2° C. in the present disclosure. As used herein, "ambient conditions" means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term "fraction" refers to a numerical quantity which defines a part up to, but not including, 100 percent or the entirety of the thing in question.

As used herein the term "disposed" refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term "Scanning Electron Microscopy" or "SEM" refers to a surface-imaging technique that produces images of a sample by scanning the sample with a focused beam of electrons. Unless otherwise specified, the SEM shall include all imaging techniques using electron beams for imaging.

As used herein, the term "high-resolution transmission electron microscopy (HRTEM)" refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term "X-ray diffraction" or "XRD" or "X-ray crystallography" refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

The term "unit cell" as used herein refers to the smallest and simplest volume element (i.e., parallelpiped-shaped block) of a crystal that is completely representative of the unit or pattern of the crystal, such that the entire crystal can be generated by translation of the unit cell. The dimensions of the unit cell are defined by six numbers: dimensions a, b and c; and, angles $\alpha$, $\beta$ and $\gamma$ (Blundel et al., 1976, Protein Crystallography, Academic Press, the disclosure of which is incorporated herein by reference in its entirety). A crystal is an efficiently packed array of many unit cells.

A tetragonal crystalline phase refers to a crystal structure in which the unit cell of the lattice has two axes of equal-length (a=b) and a third axis (c) that is of different length, but wherein all axes are at right angles (90°) to each other ($\alpha=\beta=\gamma$)=90°. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term "particle" refers to a small object that acts as a whole unit with regard to its transport and properties. As used herein, "nanoparticles"—sometimes contracted herein to NPs—refers to particles having a particle size of 1 nanometer (nm) to 1000 nm.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90" refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term "nanocomposite" refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term "porosity" refers to a measure of the void or vacant spaces within a material. As used herein, the term "pore volume" refers to the total volume of void spaces (pores) within a material that is capable of being filled by a gas or liquid: it is typically expressed in cubic centimeters per gram ($cm^3/g$). As used herein, the term "pore diameter" refers to the median width or size of the pores (void spaces) within a material, typically measured in nm or angstroms (Å).

Pores may be micropores, mesopores, macropores, and/or a combination thereof. The pores exist in the bulk material, not necessarily in the molecular structure of the material. The term 'microporous' means that particulate crystalline nanocomposite have pores with an average pore width (i.e., diameter) of less than 2 nm. The term 'mesoporous' means the pores of the nanocomposite have an average pore width of 2-50 nm. The term 'macroporous' means the pores of the nanocomposite have an average pore width larger than 50 nm. Pore size may be determined by methods including, but not limited to, gas adsorption (e.g., $N_2$ adsorption), mercury intrusion porosimetry, and imaging techniques such as SEM and X-ray computed tomography (XRCT).

Having regard to a parameter distribution of the disclosed material, the term "monomodal" references only one peak being observed in a frequency distribution graph of said parameter. The term "polymodal" references a distribution with two or more distinct peaks or modes. The terms bimodal and trimodal may be utilized herein to reference the presence of two or three modes, respectively.

As used herein, the Brunauer-Emmett-Teller (BET) analysis references the method of measuring the specific surface area ($m^2/g$) of a solid material via the adsorption of gas molecules onto the surface of the solid, as detailed in standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134:1998-02.

As used herein, the term "porous particulate nanocomposite" refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

The term "graphitic carbon nitride" often abbreviated to g-$C_3N_4$, refers to a family of carbon nitride compounds with a layered structure similar to graphene. Graphitic carbon nitride may be considered a synthetic polymer primarily composed of carbon and nitrogen, with some hydrogen impurities.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant ($\varepsilon$) of more than 5 as measured at 25° C. The determination of dielectric constant (E) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, 'comminuting' refers to process of reducing the average size of solid materials into smaller particles, by crushing, grinding, cutting, vibrating, or other processes.

As used herein, the term 'membrane' refers to a porous structure that is capable of separating components of a homogeneous or heterogeneous fluid. In particular, 'pores' in the sense of a membrane indicate voids permitting fluid communication between different sides of the structure. More particularly in use, when a homogeneous or heterogeneous fluid is passed through the membrane, some components of the fluid can pass through the pores of the membrane into a 'permeate stream', some components of the fluid can be retained by the membrane and can thus accumulate in a 'retentate' and/or some components of the fluid can be rejected by the membrane into a 'rejection stream'. It is not precluded in the present disclosure that both the retenate and the permeate can constitute valuable materials that can be subject to further processing, if required.

Membranes can be of various thicknesses, with homogeneous or heterogeneous structures. The membranes of the present disclosure are neutral or uncharged, and particle transport is considered to be passive, which passive transport can be facilitated by pressure, concentration, and chemical or electrical gradients of the filtration process.

As used herein, the term 'filtration' refers to a mechanical or physical operation that can be employed for the separation of constituents of homogeneous or heterogeneous solutions. Types of filtration can be categorized based on the estimated sizes of chemicals to be separated and can involve particle filtration (>10 micrometer (μm)); microfiltration (0.1-10 μm); ultrafiltration (0.01-0.1 μm); nanofiltration (NF) (0.001-0.01 μm); and, reverse osmosis, or RO (<0.001 μm).

As used herein, the term 'permeate' refers to a filtered liquid that passes through a membrane during a filtration process, leaving behind larger particles or contaminants.

The term 'shear rate' as used herein, references the rate of increase in the velocity of a fluid flowing in the x direction per unit distance in the orthogonal y direction. The shear rate has units of reciprocal time ($s^{-1}$).

The term "sonication" refers to a process that uses sound energy (sonic waves) to agitate particles in a sample. As used herein, the term "ultrasonication" refers to irradiation with ultrasonic waves having a frequency of at least 20 kHz. Without intention to limit the present disclosure, (ultra) sonication may be performed using an (ultra) sonic bath or an (ultra) sonic probe.

As used herein, the term "calcination" refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, "$C_1$-$C_n$ alkyl" group refers to a monovalent group that contains from 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

As used herein, the term 'photodegradation' refers to the process by which a material undergoes chemical breakdown or alteration due to exposure to light. This process typically results in the breaking of molecular bonds within the material, leading to the formation of new compounds or the degradation of its physical and chemical properties.

As used herein, the term 'contaminants' refer to the harmful substances or contaminants that degrade the quality of water, air, soil, or food, making them unsafe or unsuitable for specific uses. In water, contaminants include: biological agents like bacteria, viruses, and parasites; chemical substances such as heavy metals, pesticides, pharmaceuticals, and industrial chemicals; and physical materials like dirt, debris, and sediment. These contaminants can pose serious risks to human health, the environment, and ecosystems, depending on their type, concentration, and exposure levels.

As used herein, the term 'organic contaminants' refers to carbon-based compounds, typically derived from industrial, agricultural, or domestic activities, that are present as contaminants in water or the environment. These contaminants may include pesticides, pharmaceuticals, dyes, and other synthetic or natural organic substances that can pose environmental or health risks. Exemplary organic contaminants, which may be present alone or in combination in an aqueous medium, include a dye, a phenol, a polycyclic aromatic hydrocarbon, an herbicide, a pesticide, a persistent organic contaminant, or the like.

A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta [c,d]

pyrene, dibenz [a,h]anthracene, dibenzo[a,e]pyrene, dibenzo [a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciprofloxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiame-thoxam; ryanoids such as chlorantraniliprole, cyanthanilip-role, and flubendiamide.

A pesticide intended for use against mites is known as a miticide. Examples of miticides are permethrin, ivermectin, carbamate insecticides as described above, organophosphate insecticides as described above, dicofol, abamectin, chlo-rfenapyr, cypermethrin, etoxazole, hexythiazox, imidaclo-prid, propargite, and spirotetramat.

A pesticide intended for use against snails and other mollusks is known as a molluscicide. Examples of mollus-cicides are metaldehyde and methiocarb.

A pesticide intended for use against rodents is known as a rodenticide. Examples of rodenticides are warfarin, cou-matetralyl, difenacoum, brodifacoum, flocoumafen, broma-diolone, diphacinone, chlorophacinone, pindone, difethia-lone, cholecalciferol, ergocalciferol, ANTU, chloralose, crimidine, 1,3-difluoro-2-propanol, endrin, fluroacetamide, phosacetim, pyrinuron, scilliroside, strychnine, tetramethyl-enedisulfotetramine, bromethalin, 2,4-dinitrophenol, and uragan D2.

A pesticide intended for use against viruses is known as a virucide. Examples of virucides are cyanovirin-N, grif-fithsin, interferon, NVC-422, scytovirin, urumin, virkon, zonroz, and V-bind viricie.

A persistent organic contaminant is a toxic organic chemi-cal that adversely affects human and environmental health, can be transported by wind and water, and can persist for years, decades, or centuries owing to resistance to environ-mental degradation by natural chemical, biological, or pho-tolytic processes. Persistent organic contaminants are regu-lated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlo-rodiphenyltrichloroethane (DDT), dioxins, polychlorinated dibenzofurans, chlordecone, hexachlorocyclohexane (α-and β-), hexabromodiphenyl ether, lindane, pentachloroben-zene, tetrabromodiphenyl ether, perfluorooctanesulfonic acid, endosulfans, and hexabromocyclododecane.

The present disclosure is intended to include all isotopes of atoms occurring in the present compounds and com-plexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labelled compounds of the disclosure may generally be prepared by conventional techniques known to those skilled in the art or by processes analogous to those described herein, using an appropriate isotopically-labelled reagent in place of the non-labelled reagent other-wise employed.

The present disclosure is intended to include all hydration states of a given compound or formula, unless otherwise noted or when heating a material. It is noted that references in the specification to "an embodiment", "some embodi-ments", "other embodiments" or the like indicate that the embodiment(s) described may include a particular feature, structure, or characteristic, but every embodiment may not necessarily include that particular feature, structure, or char-acteristic. Moreover, such phrases are not necessarily refer-ring to the same embodiment. Further, when a particular feature, structure, or characteristic is described in connection with an embodiment, it would be within the knowledge of one skilled in the art to affect such feature, structure, or characteristic in connection with other embodiments, whether or not explicitly described, unless clearly stated to the contrary. That is, the various individual elements described below, even if not explicitly shown in a particular combination, are nevertheless contemplated as being com-binable or arrangeable with each other to form other addi-tional embodiments or to complement the described embodi-ment(s).

An aspect of the present disclosure is directed to $CaMoO_4/CaSiO_3/g-C_3N_4$ nanocomposite fabricated via a simple hydrothermal process, characterized by a narrow bandgap (1.77-2.9 eV) for enhanced visible light photocata-lytic activity in pollutant removal.

A method of immobilizing contaminants disposed in an aqueous medium is described. In some embodiments, the contaminant comprises organic contaminants selected from the group consisting of benzene, toluene, xylene, phenol, aniline, nitrobenzene, chlorobenzene, formaldehyde, acetal-dehyde, acetic acid, benzoic acid, phthalic acid, ethylben-zene, styrene, naphthalene, anthracene, fluoranthene, pyrene, benzo[a]pyrene, polychlorinated biphenyls (PCBs), dichloromethane, chloroform, carbon tetrachloride, trichlo-roethylene, perchloroethylene, methanol, ethanol, isopropa-nol, butanol, ethylene glycol, propylene glycol, acrylonitrile, acetamide, acetonitrile, dimethylformamide, diethyl ether, tetrahydrofuran, dioxane, and pentachlorophenol. In some embodiment, the contaminants comprise organic contami-nants selected from the group consisting of: polyaromatic hydrocarbons and their halogenated derivatives; phenols and their halogenated derivatives; furanes and their halogenated derivatives; dioxines and their halogenated derivatives; biphenyls and their halogenated derivatives; and, organic dyes.

In some embodiments, the contaminants comprise inor-ganic contaminants selected from the group consisting of arsenic, lead, mercury, cadmium, chromium, nickel, copper, zinc, cobalt, manganese, aluminum, selenium, barium, beryllium, antimony, silver, strontium, uranium, radium, fluoride, chloride, nitrate, nitrite, sulfate, phosphate, cya-nide, ammonium, perchlorate, and borate. In some embodi-ments, the contaminants comprise inorganic contaminants selected from the group consisting of radioactive nuclides, toxic metals, heavy metals, and metalloids.

The method of immobilizing contaminants disposed in an aqueous medium of the present disclosure requires that aqueous medium to be brought into contact with the par-ticulate nanocomposite material for a sufficient contact time to permit adsorption of the contaminants concerned. Without intention to limit the present disclosure, the contact time aqueous medium with the particulate crystalline nanocom-posite may be from about 1 to about 120 minutes, for example from about 1 to 90 minutes, from about 1 to 60 minutes, from about 1 to 30 minutes or from about 5 to about 30 minutes. Independently of, or in addition to the afore-mentioned exemplary contact time, the particulate crystal-line nanocomposite may be provided in an amount ranging from about 0.1 to about 5 grams per liter of the aqueous medium for said contacting. For example, the particulate crystalline nanocomposite may be provided in an amount of from about 2 to about 5 grams per liter, from about 3 to about 5 grams per liter or from about 4 to about 5 grams per liter of the aqueous medium.

The aqueous medium may be provided as a static volume in which the nanocomposite material is dispersed. In an alternative embodiment, the aqueous medium may be pro-vided as a fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the particulate nanocomposite material. In this embodiment, the particulate nanocomposite material may need to constrained within a bed or, more particularly, a membrane which the aqueous medium contacts as either a perpendicular or tangential (cross-) flow stream.

Perpendicular flow filtration may be preferred where the aqueous medium feed is characterized by a low concentration of particulates given that there would be reduced residue build up on the surface of the membrane during filtration. Whilst perpendicular flow filtration may be performed continuously, it is preferably performed in a batch or semi-continuous manner, permitting the membrane to be cleaned between use cycles to remove residue build-up.

As noted, membrane separation by tangential flow filtration is not precluded in the present disclosure where the membrane comprises the afore-described particulate nanocomposite material. Conventionally, the retentate stream in tangential flow filtration is recycled. It is also typical for tangential flow filtration to be performed as a continuous process because a constant flow of the feed stream across the surface of the ultrafiltration membrane may prevent the accumulation of residues on the surface thereof.

Where membrane filtration of the aqueous medium is conducted by tangential flow filtration, the feed of the aqueous medium may be represented as a laminar flow and thereby characterized by a shear rate. The shear rate of the aqueous medium in this circumstance may typically be from about 1000 to about 10000 $s^{-1}$, for example from about 2000 to about 10000 $s^{-1}$, from about 2000 to about 8000 $s^{-1}$ or from about 4000 to about 8000 $s^{-1}$.

Independently of the use of direct flow or tangential flow filtration where a membrane comprising the particulate nanocomposite material is utilized, the step of contacting may preferably be performed at a transmembrane pressure differential, specifically a pressure difference between the retentate and permeate side of the membrane. Whilst the tolerance limit of the membrane may be a determinative of the operable transmembrane pressure differential, it is conventional herein to apply a transmembrane pressure differential of from about 50 to about 500 kPa. Exemplary transmembrane pressure differentials of from about 50 to about 400 kPa, about 50 to about 300 kPa or about 100 to about 300 kPa may be mentioned.

The transmembrane pressure differential may be controlled by inter alia: pressurizing the feed stream of the aqueous medium with a gas; adjusting the column height of the feed stream of the aqueous medium above the membrane; through the use of pumps to adjust the flow rate of the fluids on the retentate side of the membrane; through controlling drainage on the permeate side of the membrane; and/or, through the use of suction applied to the permeate side of the membrane.

The transmembrane pressure differential may be maintained at a constant value within the aforementioned ranges during the contacting step. In the alternative, the transmembrane pressure differential may be moderated to provide a constant permeate flow rate: typically in this circumstance, the transmembrane pressure differential will increase during an contacting step or cycle and should, of course, be monitored to ensure that the pressure tolerance limit of the membrane is not exceeded.

The particulate crystalline nanocomposite material utilized in the present method comprises a tetragonal $CaMoO_4$ crystalline phase, a $CaSiO_3$ crystalline phase, and a graphitic-$C_3N_4$ crystalline phase. At least a fraction of the graphitic-$C_3N_4$ is in the form of mesoporous nanosheets. In some embodiments, the morphology of the g-$C_3N_4$ may be nanocrystals, nanorectangles, nanotriangles, nanopentagons, nanohexagons, nanodisks, nanoribbons, nanogranules, nanowhiskers, nanoflakes, nanofoils, nanobelts, and mixtures thereof. In a preferred embodiment, the g-$C_3N_4$ in the particulate crystalline nanocomposite consists essentially of sheet morphologies. Further, at least a fraction of the graphitic-$C_3N_4$, preferably at least about 35 wt. %, for example at least about 40 wt. %, at least about 45 wt. %, at least about 50 wt. %, at least about 55 wt. %, at least about 60 wt. %, at least about 65 wt. %, at least about 70 wt. %, at least about 75 wt. %, or at least about 78 wt. %, is in the form of mesoporous nanosheets. In another preferred embodiment, at least about 80 wt. % of the graphitic-$C_3N_4$ is in the form of mesoporous nanosheets.

The mass ratio by weight of $CaMoO_4$:$CaSiO_3$:graphitic-$C_3N_4$ in the particulate crystalline nanocomposite is about (0.8-1.2):(0.8-1.2):(0.8-1.2), for example about (0.6-1.5):(0.75-1.25):(0.9-1.35), or about (0.65-1.4):(0.65-1.4):(0.85-1.55).

In some embodiments, at least a fraction of the $CaMoO_4$ and at least a fraction of the $CaSiO_3$ of the particulate crystalline nanocomposite are in the form of substantially spherical particles.

In some embodiments, at least about 50 wt. %, for example at least about 55 wt. %, at least about 60 wt. %, at least about 65 wt. %, at least about 70 wt. %, or at least about 75 wt. % of the $CaMoO_4$ of the particulate crystalline nanocomposite is in the form of substantially spherical particles. In some embodiments, at least about 50 wt. %, for example at least about 55 wt. %, at least about 60 wt. %, at least about 65 wt. %, at least about 70 wt. %, or at least about 75 wt. % of the $CaSiO_3$ of the particulate crystalline nanocomposite is in the form of substantially spherical particles.

In some embodiments, the particulate crystalline nanocomposite is porous. A porous material is the one that forms a porous bulk solid. Pores may be micropores, mesopores, macropores, and/or a combination thereof. The pores exist in the bulk material, not necessarily in the molecular structure of the material.

The Brunauer-Emmett-Teller (BET) specific surface area of the particulate crystalline nanocomposite is in a range of from about 60 to about 100 square meters per gram ($m^2$/g), for example about 60 to about 90 $m^2$/g, from about 65 to about 85 from about 70 to about 85 $m^2$/g, or from about 75 to about 85 $m^2$/g. In a preferred embodiment, the $CaMoO_4$/$CaSiO_3$-g-$C_3N_4$ nanocomposite material has a BET surface area about 78.1 $m^2$/g.

The average pore volume of the particulate crystalline nanocomposite, according to the BJH measurement method, is in a range of from about 0.1 to about 0.5 $cm^3$/g, for example about 0.1 to about 0.4 $cm^3$/g, about 0.1 to about 0.3 $cm^3$/g, or about 0.15 to about 0.25 $cm^3$/g. In a preferred embodiment, according to the BJH measurement method, the $CaMoO_4$/$CaSiO_3$/g-$C_3N_4$ nanocomposite material has a from about 0.20 to about 0.25 $cm^3$/g.

The average pore diameter of the particulate crystalline nanocomposite, according to the BJH measurement method, is in the range of from about 15 to about 25 nm, for example about 15 to about 20 nm. In a preferred embodiment, according to the BJH measurement method, $CaMoO_4$/$CaSiO_3$/g-$C_3N_4$ nanocomposite material has an average pore diameter of from about 18 to about 20 nm.

In some embodiments, the pore size distribution of the particulate crystalline nanocomposite is unimodal. This unimodal pore structure suggests that the nanocomposite has pore distribution where most of the pores are concentrated around a single, modal size. Herein a significant of the pores of the particulate crystalline nanocomposite fall within a small size range, leading to a single, narrow peak in the pore size distribution curve.

In some embodiments, TEM images of $CaMoO_4/CaSiO_3/g-C_3N_4$ nanocomposite showed a two-dimensional porous structure constructed with curled and wrinkled nanosheets and platelets of the $g-C_3N_4$. In some embodiments, TEM image shows well dispersion of homogeneous spherical metal oxides nanoparticles having a particle size of approximately 7 to 10 nm on nanosheets of $g-C_3N_4$ . . . . In a preferred embodiment, TEM image shows good dispersion of said homogeneous spherical metal oxides nanoparticles on the nanosheets of $g-C_3N_4$.

In some embodiments, the substantially spherical particles have a median volume particle size (Dv50), as determined by SEM, from about 5 to about 20 nm, for example from about 5 to about 15 nm.

FIG. 1 illustrates a schematic flow chart of a method 50 of preparing the particulate crystalline nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

According to a further aspect of the present disclosure, a method of making the aforementioned $CaMoO_4@CaSiO_3@g-C_3N_4$ nanocomposite material is described (FIG. 1). The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming a solution of a calcium salt and an alkali metal silicate in a solvent including water and a $C_1-C_4$ alkanol. Exemplary calcium salts, which may be present alone or in combination, include but are not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In an embodiment, the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$). In a preferred embodiment, calcium salt is calcium nitrate.

Exemplary alkali metal silicates, which may be present alone or in combination, include but are not limited to potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In a preferred embodiment, alkali metal silicate is sodium metasilicate.

In some embodiments, the molar ratio of the calcium salt to the alkali metal silicate is from about 1:5 to 5:1, for example about 1:4 to 4:1, about 3:1 to 1:3, about 1:2 to 2:1, or about 1:1.

Exemplary $C_1-C_4$ alkanols, which may be present alone or in combination, include but are not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, the $C_1-C_4$ alkanol comprises or consists of ethanol.

In an embodiment of step 52, the volume-by-volume (v/v) ratio of water to $C_1-C_4$ alkanol is in the range of about 1:5 to 5:1, for example about 1:4 to 4:1, about 1:3 to 3:1, or about 1:2 to 2:1. In a preferred embodiment, the v/v ratio of water to $C_1-C_4$ alkanol is 1:1.

At step 54, the method 50 includes heating the solution at a temperature of from about 150 to about 250° C. to form a dry product of $CaSiO_3$. This step involves the chemical reaction and dehydration process that are necessary for converting the precursor materials into the desired solid product. In some embodiments, heating takes place at temperature of from about 110 to about 210° C., for example from about 120 to about 220° C., from about 130 to about 230° C., from about 140 to about 220° C., from about 150 to about 210° C., from about 160 to about 200° C., from about 170 to about 190° C., or about 180° C. to form the dry product of $CaSiO_3$. The solution is preferably heated in an autoclave; optionally, other known heating appliances may be used.

At step 56, the method 50 includes forming graphitic-$C_3N_4$ by heating urea in a closed vessel at a temperature of from about 500 to about 700° C. Heating is done in a closed vessel at step 56 to maintain a controlled atmosphere, preventing the escape of volatile components and ensuring the formation of graphitic-$C_3N_4$ under the required conditions of pressure and temperature. In some embodiments, heating takes place at temperature of from about 500 to about 700° C., for example from about 525 to about 675° C., from about 550 to about 650° C., from about 575 to about 625° C., or about 600° C. Typically, heating is conducted for a period of from about 30 to 60 minutes, for example about 40 to about 50 minutes, or about 45 minutes. In an exemplary preferred embodiment, the urea is heated in a closed vessel to a temperature of about 600° C. for a period of about 45 minutes.

At step 58, the method 50 includes forming an acidified aqueous solution of a molybdenum salt and a reducing sugar. In this reaction, the molybdenum salt is reduced by the reducing sugar in an acidified aqueous solution, leading to the formation of reduced molybdenum species. Exemplary molybdenum salts, which may be present alone or in combination, include, but are not limited to, lithium molybdate, sodium molybdate, potassium molybdate and ammonium molybdate. In a preferred embodiment, the molybdenum salt is ammonium molybdate.

The aqueous solution is desirably acidified using a mineral acid. Mention as exemplary acids in this context may be made of nitric acid, hydrochloric acid, sulphuric acid and phosphoric acid. The use of nitric acid may be mentioned in particular. Independently of, or additional to the use of these acids, it is preferred that the acidified aqueous solution has a pH of from about 2 to about 6, for example of from about 2 to about 5 or from about 3 to about 5.

Suitable examples of reducing sugar include, but are not limited to, glucose, fructose, galactose, ribose, maltose and lactose. These reducing sugars may facilitate the reduction of various metallic ions to their lower oxidation states in an acidified aqueous solution, depending on the specific reaction and desired product. In some embodiments, the reducing sugar may be selected from monosaccharides, disaccharides, oligosaccharides, or polysaccharides. In a preferred embodiment, the reducing sugar is a monosaccharide selected from the group consisting of trioses, tetroses, pentoses, hexoses and heptoses. In another preferred embodiment, the reducing sugar is selected from the group consisting of erythrose, threose, erythrulose, ribose, arabinose, xylose, lyxose, ribulose, arabulose, xylulose, lyxulose, glucose, mannose, galactose, allose, altrose, talose, gulose, idose, fructose, psicose, sorbose, tagatose, and sedoheptulose. In yet another preferred embodiment, the reducing sugar is xylose.

In some embodiments, the w/w ratio of the molybdate salt to the reducing sugar is about 1:5 to 5:1, for example from about 1:4 to 4:1, from about 1:3 to 3:1, from about 1:2 to 2:1, or about 1:1.

At step 60, the method 50 includes heating the acidified aqueous solution at a temperature of from about 150 to about 250° C. for a sufficient duration to carbonize the reducing sugar, thereby forming a carbonized product. Heating the acidified aqueous solution at 150 to 250° C., preferably from about 150 about 200° C. carbonizes the reducing sugar by promoting dehydration, pyrolysis, and decomposition, resulting in the formation of carbonaceous residues that may interact with metal species.

At step 62, the method 50 includes comminuting the carbonized product of the heating stage. Comminuting is done to reduce the particle size of the carbonized product, increasing its surface area for better reactivity and uniformity in subsequent processing steps. As used herein, 'comminuting' refers to process of reducing the average size of solid materials into smaller particles, by crushing, grinding, cutting, vibrating, or other processes.

At step 64, the method 50 includes calcining the comminuted carbonized product at a temperature of from about 500 to about 1200° C. for a duration of about 1 to about 5 hours to form $MoO_3$. Calcining is done to convert the carbonized product into $MoO_3$ by driving off volatile components and promoting the oxidation of the material at high temperatures, ensuring the formation of the desired molybdenum trioxide. In some embodiments, calcination is done at a temperature of from about 500 to about 1000° C. for a duration of from about 1 to about 5 hours. For example, calcination may be performed at a temperature of from about 500 to about 900° C. for a duration of from about 1.5 to about 5 hours, or at a temperature of from about 500 to about 800° C. for a duration of from about 2 to about 5 hours. In a preferred embodiment, the comminuted carbonized product is calcined at a temperature of from about 500 to about 700° C. for a duration of from about 3 to about 5 hours to form $MoO_3$.

At step 66, the method 50 includes dispersing the $CaSiO_3$, graphitic-$C_3N_4$ and $MoO_3$ in a polar protic solvent and heating the dispersion: at a temperature of from about 150 to about 250° C.; and, at a pressure of from about 2 to about 8 bar. Dispersion is performed to ensure a uniform distribution of $CaSiO_3$, graphitic-$C_3N_4$, and $MoO_3$ in the solvent, allowing for better interaction among the components under controlled heating and pressure conditions.

In some embodiments, the $CaSiO_3$, graphitic-$C_3N_4$ and $MoO_3$ are dispersed in the polar protic solvent to form a mixture. In some embodiments, the mixture may optionally be further sonicated or ultrasonicated to enhance the dispersion of $CaSiO_3$, graphitic-$C_3N_4$, and $MoO_3$ in the polar solvent by using (ultra) sonic waves to break up agglomerates and promote a uniform mixture.

In some embodiments, the dispersion is heated at a temperature of from about 80 to about 120° C.; and, at a pressure of from about 0.5 to about 3 bar. For example, the dispersion is heated: at a temperature of from about 90 to about 180° C. or from about 120 to about 220° C.; and, at a pressure of from about 1.5 to about 4.5 bar, or from about 1.8 to about 7 bar. In a preferred embodiment, the dispersion is heated: at a temperature from about 150 to about 250° C.; and, at a pressure of about 2 to about 8 bar.

Exemplary polar protic solvents include, but are not limited to, methanol, isopropanol, n-propanol, butanol, isobutanol, tert-butanol, pentanol, hexanol, cyclohexanol, ethylene glycol, propylene glycol, glycerol, formamide, mono($C_1$-$C_4$)alkyl ethers of ethylene glycol, mono($C_1$-$C_4$) alkyl ethers of propylene glycol dimethylformamide (DMF), acetic acid, propionic acid, lactic acid, formic acid, citric acid, phosphoric acid, trifluoroacetic acid, water, ammonia, methylamine, ethylamine, isopropylamine, n-propylamine, butylamine, sec-butylamine, tert-butylamine, diethylamine, dipropylamine, dimethylamine, triethylamine, triethanolamine, n-methylformamide (NMF), n-methylacetamide (NMA), hydrazine, hydroxylamine, and urea. In an exemplary embodiment, the polar protic solvent is a $C_1$-$C_4$ alkanol. In a preferred embodiment, the polar protic solvent is selected from the group consisting of mono($C_1$-$C_4$)alkyl ethers of ethylene glycol. An exemplary polar protic solvent is ethylene glycol monomethyl ether.

At step 68, the method 50 includes separating the solid particulate crystalline nanocomposite from the heated dispersion. In some embodiments, separation may be done by centrifugation, decantation, sedimentation, dialysis, ultrafiltration, distillation, fractional distillation, steam distillation, vacuum distillation, crystallization, recrystallization, adsorption, absorption, chromatography, electrophoresis, membrane filtration, solvent extraction, sublimation, coagulation, and flotation. In a preferred embodiment, the solid particulate crystalline nanocomposite is separated from the heated dispersion by filtration.

It is not precluded that the separated particulate crystalline nanocomposite is subjected to further processing. Such further processing may be performed in a single stage or multistage manner and may include one or more of: washing with water; drying; and, comminuting the nanocomposite in order to moderate particle morphology or the particle size distribution thereof. Exemplary drying conditions include a temperature of from about 50 to about 200° C., such as from about 100 to about 200° C. or from about 120 to about 180° C. Such drying may be carried out using known heating methods, such as a vacuum oven, rotary evaporator, microwave-assisted drying process, freeze-drying, and infrared drying.

The following examples are provided solely for illustration and are not to be construed as limitations of the present disclosure, as many variations thereof are possible without departing from the spirit and scope of the present disclosure.

EXAMPLES

The following examples demonstrate the synthesis and characterization of $CaMoO_4$/$CaSiO_3$/graphitic-$C_3N_4$ particulate nanocomposite and to a method of immobilizing contaminants using the synthesized particulate crystalline nanocomposite. The examples are provided solely for illustration and are not to be construed as limitations of the present disclosure, as many variations thereof are possible without departing from the spirit and scope of the present disclosure.

Example 1: Fabricating the Calcium Metasilicate (CaSiO$_3$)

Equimolar amounts of calcium nitrate (Ca(NO$_3$) 2) and sodium metasilicate (Na$_2$SiO$_3$) were dispersed in 100 ml of an ethanol (C$_6$H$_5$OH):water (H$_2$O) mixture (1:1 ratio by volume) in a 150 millilitres (mL) glass beaker and sonicated for 15 minutes (min). The mixture was transferred to a 200 mL autoclave and placed in an oven operated at 180° C. for 2.0 hours (h). The resulting product was dispersed in 500 mL of distilled water and subjected to ultrasonic treatment for 10 minutes. The solid was then filtered using a Buchner system, rinsed with distilled water, and dried at 120° C. for 1.0 hour.

Example 2: Fabricating the Graphitic Carbon Nitride (g-C$_3$N$_4$)

For the fabrication of graphitic carbon nitride (g-C$_3$N$_4$), 30.0 grams (g) of urea was placed in a 250 mL porcelain crucible and covered with its porcelain lid. The entire crucible assembly was wrapped in three layers of aluminium (Al) foil to minimize urea loss due to evaporation. The crucible was then heated in a furnace set at 600° C. for 45 minutes, resulting in the formation of g-C$_3$N$_4$.

Example 3: Preparing the MoO$_3$

Further, 10.0 grams (g) of ammonium molybdate ((NH$_4$)$_6$Mo$_7$O$_{24}$·4H$_2$O) and 10.0 g of xylose (C$_5$H$_{10}$O$_5$) were placed in a 500 mL beaker. 100 mL of distilled water was added to the mixture, which was then heated until a clear solution was obtained. 10 mL of concentrated nitric acid (HNO$_3$) was subsequently added, and the mixture was heated further until the carbonization of xylose occurred. The mixture was then placed in an oven set at 120° C. for 3.0 hours. The resulting black product was ground using a mortar, transferred to a 150 mL porcelain dish, and calcined at 550° C. for 4.0 hours to obtain the final molybdenum-based carbon composite comprising MoO$_3$

Example 4: Fabricating the CaMoO$_4$@CaSiO$_3$@g-C$_3$N$_4$

An equal amount of CaSiO$_3$, g-C$_3$N$_4$, and MOO$_3$ was transferred to a mono wave-200 vial (G30) and dispersed in 20 mL ethylene glycol monomethyl ether (C$_3$H$_8$O$_2$) via an ultrasonic bath for 30 minutes. The vial was closed with a Teflon cover and placed in the Anton Paar Monowave-200, which was operated at 180° C. and 5.0 bar pressure for 1 hour. The resulting product was dispersed in 1 L of distilled water (DW) and subjected to ultrasonic treatment for 30 minutes. The solid was then filtered using a Buchner system, rinsed with distilled water, and dried at 150° C. for 2.0 hours to obtain the final CaMoO$_4$@CaSiO$_3$@g-C$_3$N$_4$ composite material.

Figures 2, 3A:
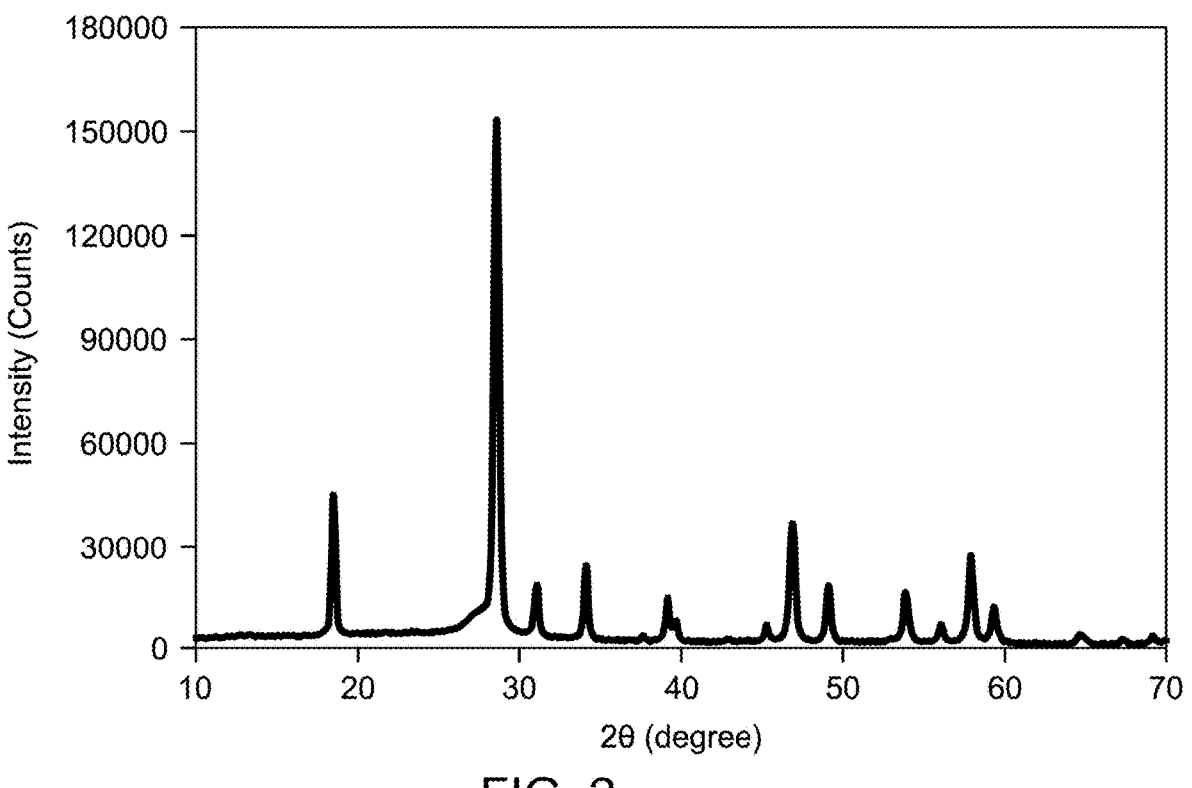
FIG. 2 is a graph depicting X-ray diffraction (XRD) pattern of the $CaMoO_4/CaSiO_3/g$-$C_3N_4$ nanocomposite, according to certain embodiments.
FIG. 3A and FIG. 3B shows transmission electron microscopic (TEM) images showing the $CaMoO_4/CaSiO_3/g$-$C_3N_4$ nanocomposite, according to certain embodiments.

X-ray diffraction (XRD) patterns for the synthesized nanocomposite are shown in FIG. 2. In particular, FIG. 2 depicts the identification of structural and crystallographic properties of the CaMoO$_4$/CaSiO$_3$/g-C$_3$N$_4$ catalyst. The intense peaks and high intensity values indicated that the powder was highly crystalline. Examination of the diffraction patterns with the standard JCPDS cards revealed the presence of CaMoO$_4$ as a major and predominant phase, together with CaSiO$_3$ and g-C$_3$N$_4$ as minor phases. The diffraction lines with 2θ° values of 18.6°, 28.6°, 31.2°, 34.3°, and 47.1° were successfully indexed to the tetragonal CaMoO$_4$ JCPDS Card No. 00-029-0351, the disclosure of which is incorporated herein by reference in its entirety. The diffraction peaks for the catalyst were corresponding to the Miller indices (101), (112), (004), (200), and (204) plans.

The diffraction peaks for CaSiO$_3$ at 2θ° values of 17.8°, 30.7°, and 34.1° corresponded to the anorthic phase of CaSiO$_3$, identified using the JCPDS Card No. 01-072-1396, the disclosure of which is incorporated herein by reference in its entirety planes. These diffractions originated from the Miller indices (111), (030), and (212) plans. The diffractions related to g-C$_3$N$_4$ were observed at 2θ° values of 46.8°, and 59.5°, identified using the COD No. 00-050-1512, the disclosure of which is incorporated herein by reference in its entirety. Minor traces of SiO$_2$ were detected at 2θ° values of 19.3° and 25.1°, corresponding to the JCPDS Card No. No. 00-049-0629, the disclosure of which is incorporated herein by reference in its entirety. All these results confirmed the successful fabrication of CaMoO$_4$/CaSiO$_3$/g-C$_3$N$_4$.

Figure 3B:
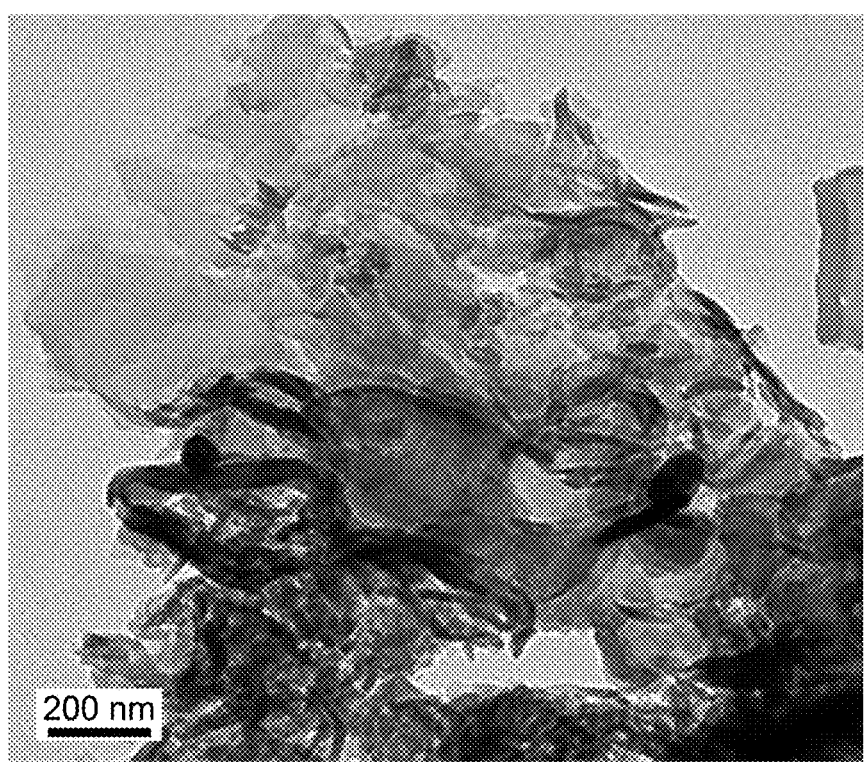
Figure 3C:
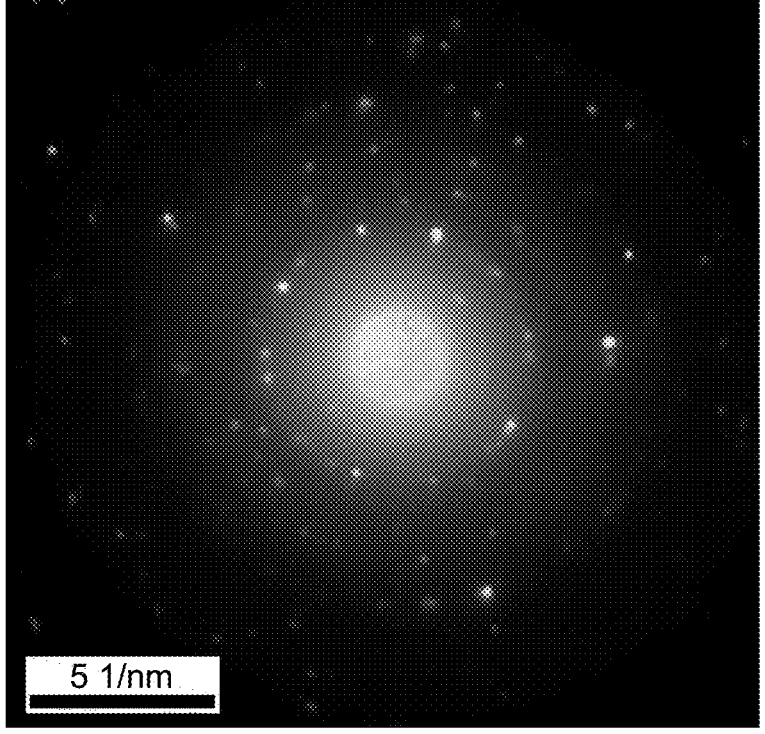
FIG. 3C depicts selected area electron diffraction (SAED) pattern of the $CaMoO_4/CaSiO_3/g$-$C_3N_4$ nanocomposite, confirming the presence of a polycrystalline structure, according to certain embodiments.
Figure 3D:
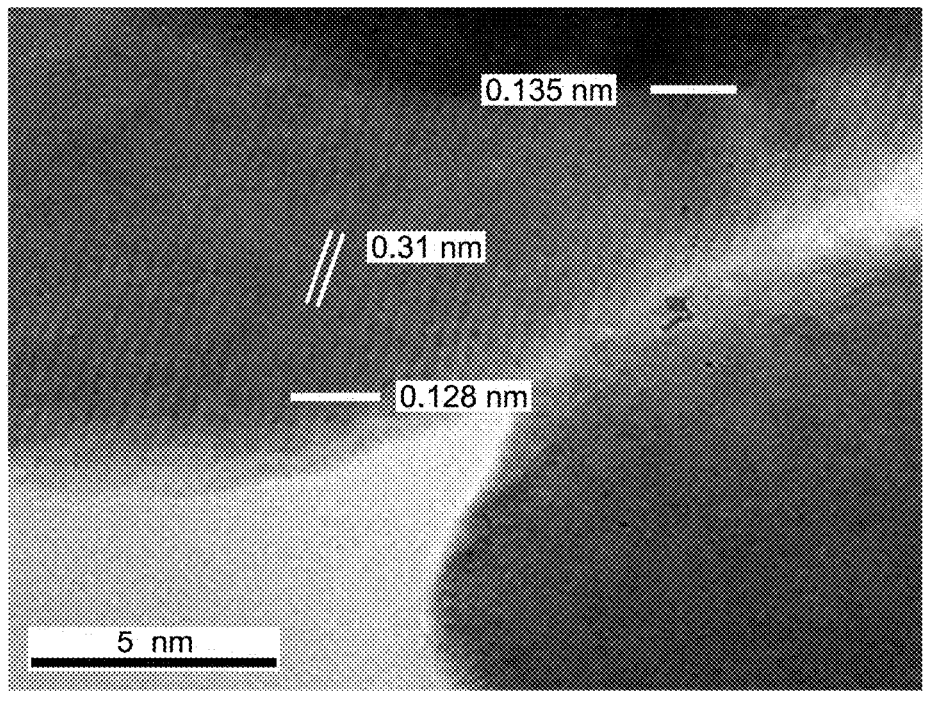
FIG. 3D shows a High Resolution Transmission Electron Microscopic (HRTEM) image with interplanar spacing measurements for the $CaMoO_4/CaSiO_3/g$-$C_3N_4$ nanocomposite at a resolution of 5 nm, according to certain embodiments.
Figure 3E:
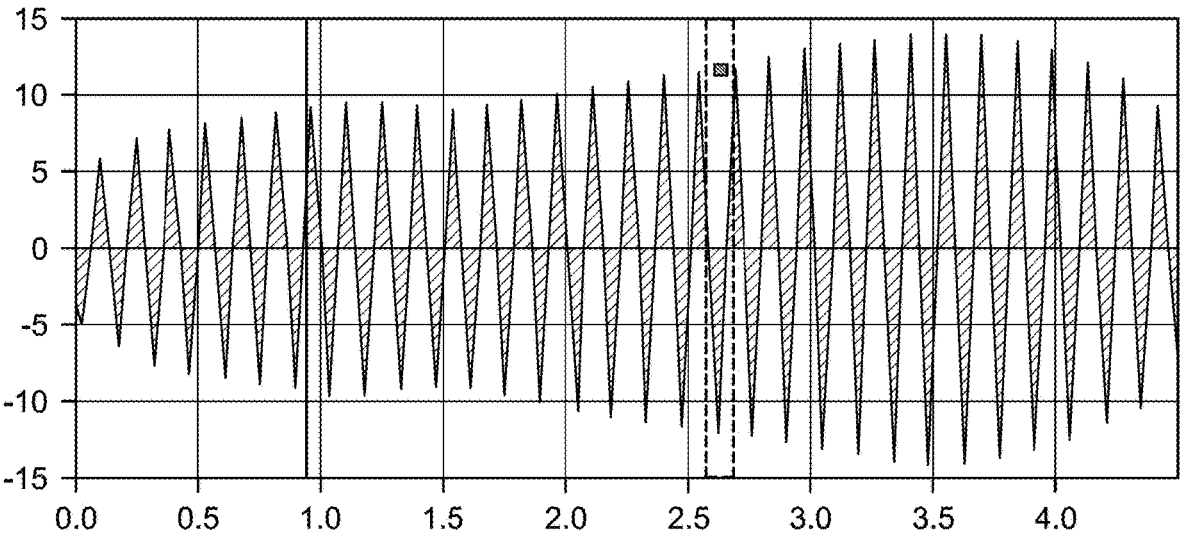
FIG. 3E is a Fast Fourier Transform (FFT) pattern of a $CaMoO_4/CaSiO_3/g$-$C_3N_4$ nanocomposite, according to certain embodiments.
Figure 3F:
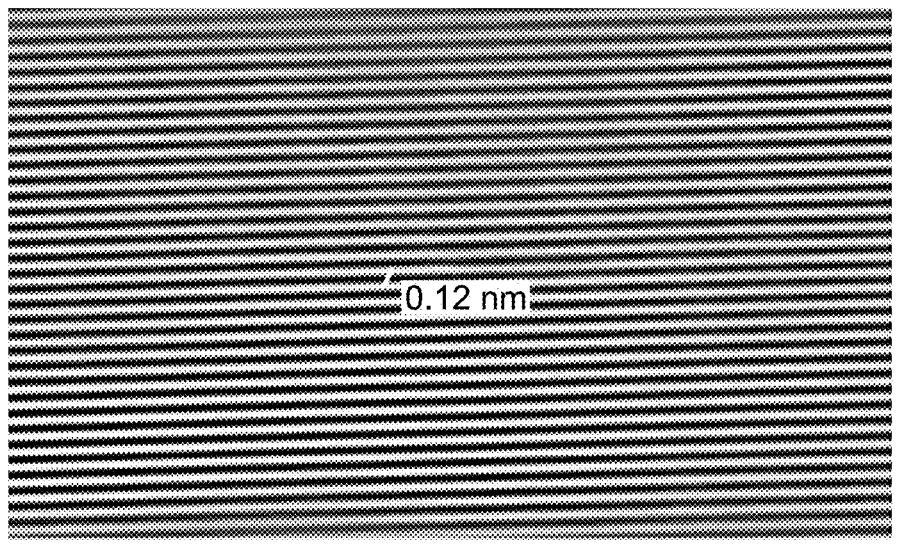
FIG. 3F is a Fast Inverse Fourier Transform (IFFT) pattern of a $CaMoO_4/CaSiO_3/g$-$C_3N_4$ nanocomposite, according to certain embodiments

Transmission electron microscopy (TEM) images of the CaMoO$_4$/CaSiO$_3$/g-C$_3$N$_4$ nanocomposite are shown in FIGS. 3A-3B. The TEM images showed that two-dimensional (2D) porous structure was constructed with curled and wrinkled nanosheets and platelets of the g-C$_3$N$_4$, as shown in FIGS. 3A-3B. The images shown a homogeneous dispersion of spherical metal oxides nanoparticles with a size of 9.2 nm on the nanosheets of g-C$_3$N$_4$. The corresponding SAED pattern revealed diffraction spots with interplanar spacings of 0.42 nm, 0.27 nm, and 0.206 nm, 0.179, and 0.144 nm corresponding to (CaSiO$_3$; 120, CaMoO$_4$: 101), (CaMoO$_4$: 200, CaSiO$_3$: 122, g-C$_3$N$_4$; 200), (CaMoO$_4$: 213, CaSiO$_3$: 013), (CaMoO$_4$: 220, CaSiO$_3$: 250), and (CaMoO$_4$: 321, CaSiO$_3$: 330) diffraction planes (FIG. 3C). The corresponding HRTEM of the composite showed a plane spacing of 0.31 nm related to the (CaMoO$_4$: 112, g-C$_3$N$_4$; 110), where 0.135 nm, and 0.128 nm were related, respectively, to (CaMoO$_4$: 112, g-C$_3$N$_4$; 221, CaMoO$_4$: 323), and (CaMoO$_4$: 400), planes, characterizing the heterostructure formation (FIG. 3D). The FFT and IFFT measurements showed a d value of 0.12 nm for the CaMoO$_4$/CaSiO$_3$/g-C$_3$N$_4$ nanocomposite, signifying the lattice spacing of (CaMoO$_4$: 332, g-C$_3$N$_4$; 410) indicating the development of the g-C$_3$N$_4$ structure (FIG. 3E and FIG. 3F).

Figure 4A:
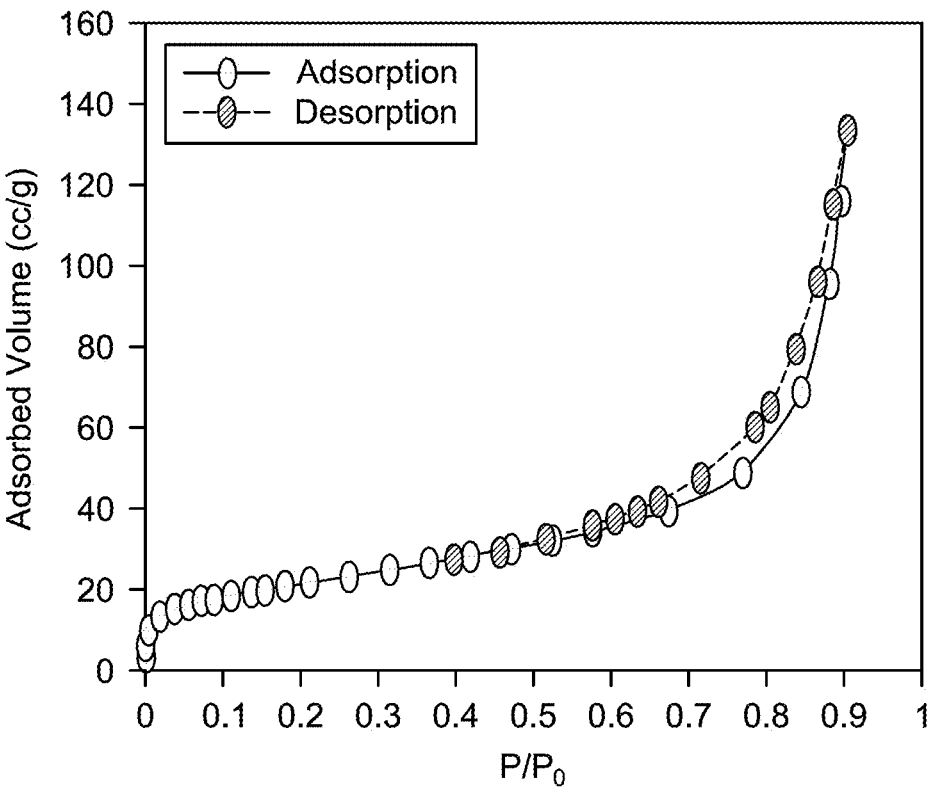
FIG. 4A shows nitrogen ($N_2$) adsorption-desorption isotherms of a $CaMoO_4/CaSiO_3/g$-$C_3N_4$ nanocomposite, according to certain embodiments.
Figure 4B:
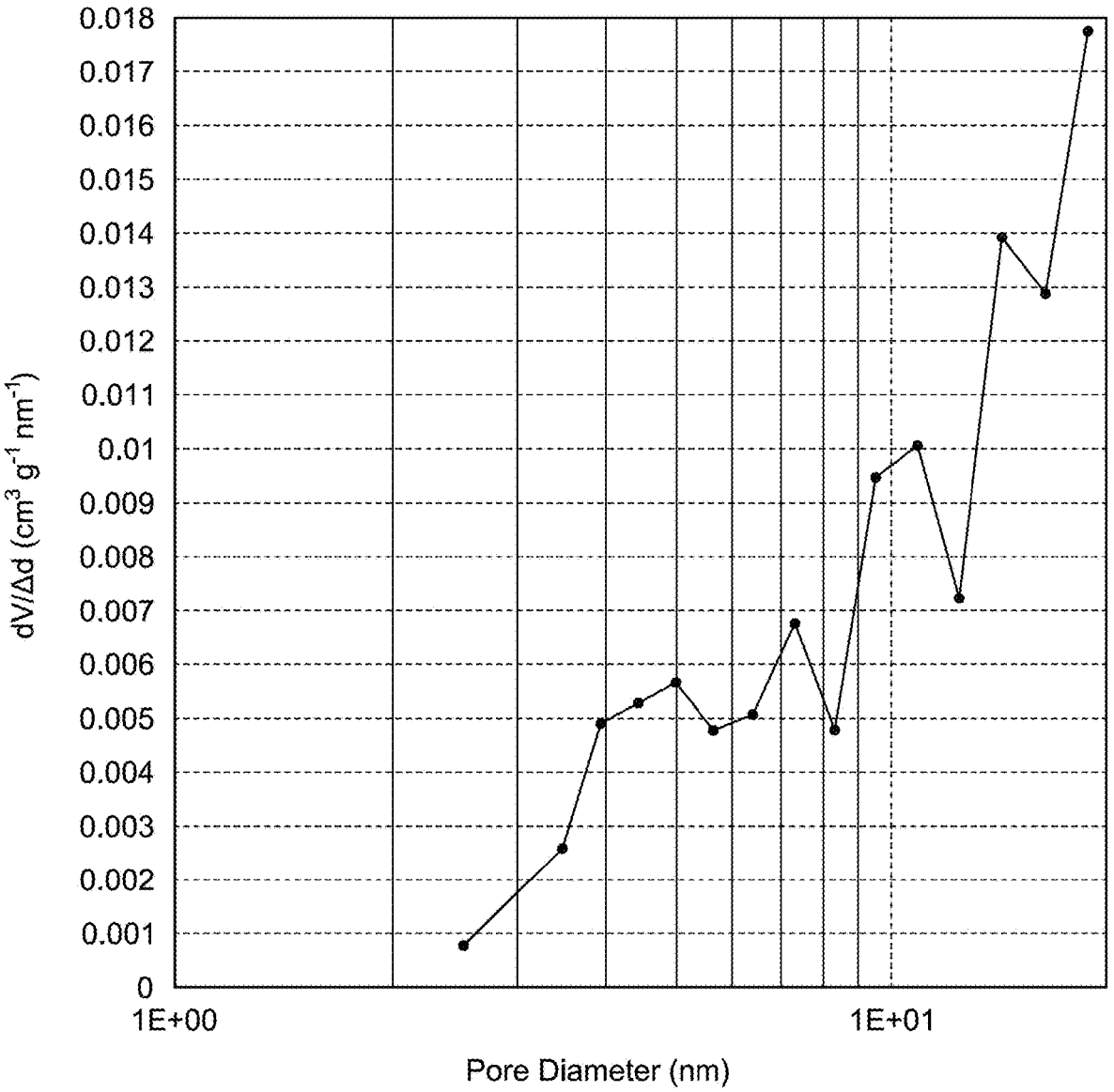
FIG. 4B shows pore size distribution of a $CaMoO_4/CaSiO_3/g$-$C_3N_4$ nanocomposite, according to certain embodiments.

Further, FIGS. 4A-4B illustrates the nitrogen adsorption-desorption isotherms of the CaMoO$_4$/CaSiO$_3$/g-C$_3$N$_4$ nanocomposite. The nitrogen sorption isotherm of the belonged to type IV with a noticeable hysteresis loop, indicating the formation of mesoporous structures. However, shifting the loop to a relatively higher pressure (P/P0=0.63-1) suggests the presence of wide mesopores, which may result from the deposition of metal oxides particles in the wide pores of g-C$_3$N$_4$. Furthermore, the Brunauer-Emmett-Teller (BET) surface area of the CaMoO$_4$/CaSiO$_3$/g-C$_3$N$_4$ sample was calculated to be 78.1 meter square per gram (m$^2$g$^{-1}$). The marked high specific surface area reflects the good dispersion of these metal oxides nanoparticles on g-C$_3$N$_4$. and CaSiO$_3$. Moreover, the pore size distribution curves, plotted using the Barrett-Joyner-Halenda (BJH) method, for the CaMoO$_4$/CaSiO$_3$/g-C$_3$N$_4$ sample exhibited unimodal distribution with average pore diameters maximized at 18.92 nm and pore volume of 0.21 cubic centimeters per gram (cm$^3$g$^-$

23

1). All the isotherms belonged to the category $H_3$ type of pores, which did not exhibit limiting adsorption at high P/Po and arise due to aggregation of plate-like particles giving rise to slit-shaped pores. This indicated that the assembly of the $CaMoO_4/CaSiO_3/g-C_3N_4$ composite resulted in a mesoporous array.

Further, 0.05 g of sorbent was measured in a separate 150 mL beaker. 100 mL of the 100 mg per liters ($L^{-1}$) Basic fuchsine (BF) solution was poured into each beaker. A portion of the mixture was withdrawn till the BF sorption reached the equilibrium. The aliquots were filtered via a 0.22 micrometer (μm) syringe filter, and the absorbance was measured utilizing a UV-Vis-spectrophotometer (2=550 nm).

The contact time analysis of Basic fuchsine (BF) sorption onto the as-prepared nanocomposite was analyzed. The BF absorbance measured during the examination was used to calculate the remaining unadsorbed concentrations at each time interval using equation (1). Equation (2) was used to calculate the adsorption capacity at each time period (t), wherein qt refers to the adsorbed contaminant in milligrams per gram of sorbent (qt, mg $g^{-1}$).

$$C=Absorbance sample\ Absorbance standard \times conc\text{-}.standard \quad (1)$$

$$qt=(Co-Ct)*V/m \quad (2)$$

wherein: Co the initial concentration; Ct concentration at time, t; V is the Volume of solution used; and, m is the mass of adsorbent.

Figure 5:
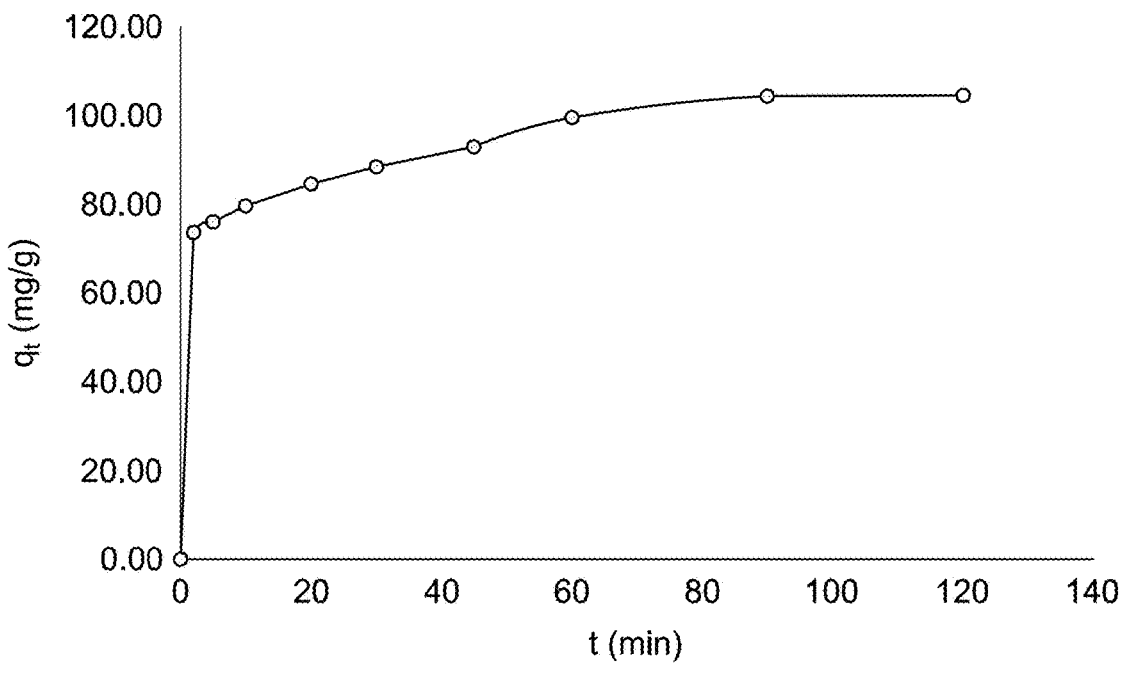
FIG. 5 is a graph of the contact time examination of Basic fuchsine (BF) sorption onto a $CaMoO_4/CaSiO_3/g$-$C_3N_4$ nanocomposite, according to certain embodiments.

Further, FIG. 5 illustrates the adsorption trend of BF onto prepared $CaMoO_4/CaSiO_3/g-C_3N_4$ nanocomposite. The $CaMoO_4/CaSiO_3/g-C_3N_4$ exhibited qt values of 40.8 milligrams per gram (mg/g), reflecting its capability for treating water contaminated by organic pollutants. Notably, nearly 90% of the qt value was achieved within the first 30 minutes, and the overall sorption process reached equilibrium within 90 minutes, demonstrating the $CaMoO_4/CaSiO_3/g-C_3N_4$ as a fast-acting treatment sorbent.

The adsorption rate order of BF removal by $CaMoO_4/CaSiO_3/g-C_3N_4$ was examined via pseudo-first-order (PF), as given in eq. (3) and pseudo-second-order (PS), as given in eq. (4) kinetic models.

$$ln(qe-qt)=lnqe-k_1 \cdot t \quad (3)$$

$$(dqt/dt)=k_2(qe-qt)^2 \quad (4)$$

Figure 6:
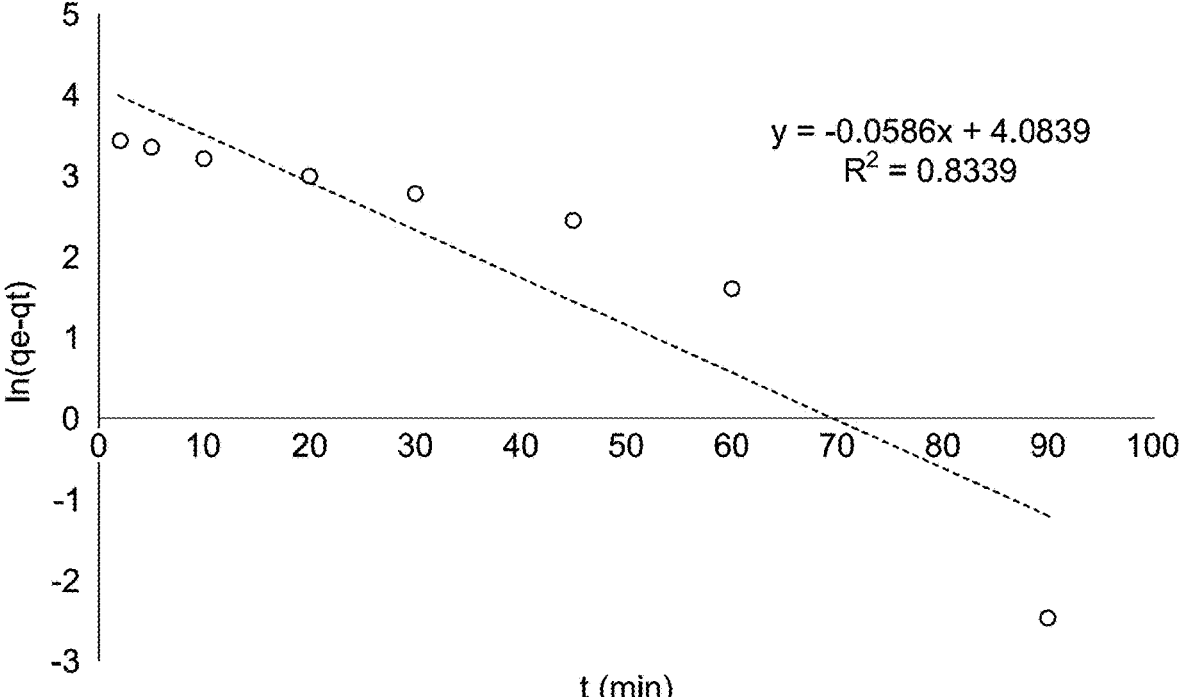
FIG. 6 is a graph of the pseudo-first-order (PF) examination of Basic fuchsine (BF) sorption onto a $CaMoO_4/CaSiO_3/g$-$C_3N_4$ nanocomposite, according to certain embodiments.
Figure 7:
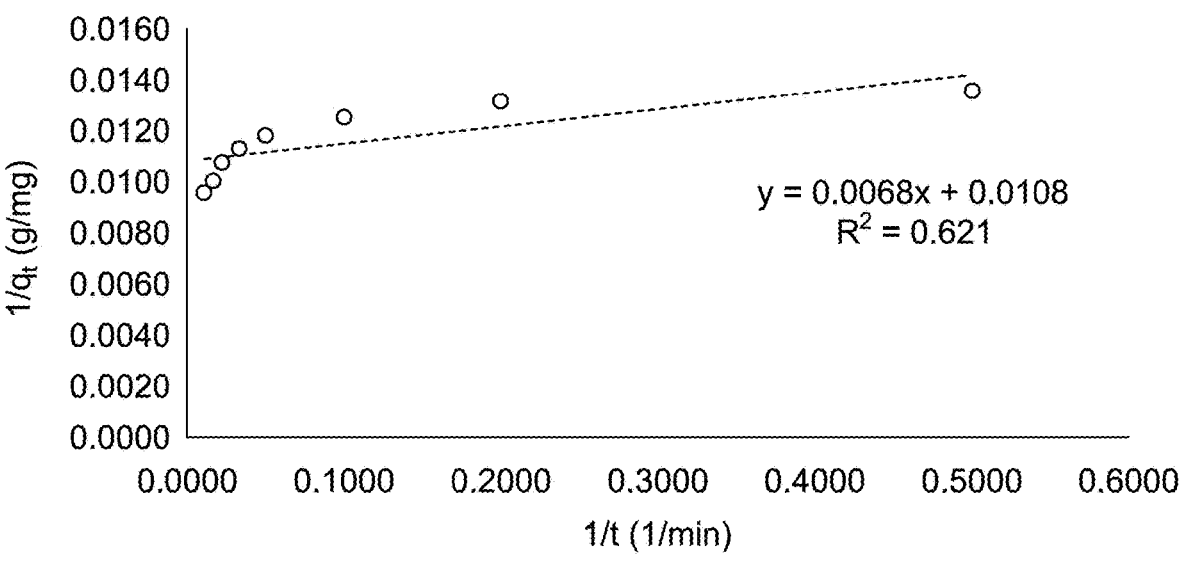
FIG. 7 is a graph of the pseudo-second-order (PS) examination of Basic fuchsine (BF) sorption onto a $CaMoO_4/CaSiO_3/g$-$C_3N_4$ nanocomposite, according to certain embodiments.

The symbol qe (mg/g) signifies the equilibrium adsorption capacity. The PF and PS constants are also time-dependent, with the former represented as $k_1$ ($min^{-1}$) and the latter as $k_2$ grams per milligram per minute (g $mg^{-1}$ $min^{-1}$). The PF plot of the BF adsorption onto $CaMoO_4/CaSiO_3/g-C_3N_4$ nanocomposite, shown in FIG. 6. Additionally, as shown in FIG. 7, the PS plots of BF sorption onto $CaMoO_4/CaSiO_3/g-C_3N_4$. The rate-order output of BF removal explained that the sorption on $CaMoO_4/CaSiO_3/g-C_3N_4$ showed better fitting to the PF model.

The rate-control mechanism of BF removal by $CaMoO_4/CaSiO_3/g-C_3N_4$ was examined using the intraparticle diffusion model (IPD), as given in eq. (5) and the liquid-film diffusion model (LFD), as given in eq. (6).

$$q_t=K_{IP}*t^{1/2}+C_i \quad (5)$$

$$ln(1-F)=-K_{LF}*t \quad (6)$$

The IPD constant is indicated by $K_{IP}$ milligrams per gram per square root of minute (mg $g^{-1}$ $min^{-1/2}$), and the LFD constant is designated by $K_{LF}$ per minute ($min^{-1}$). $C_i$, the boundary layer factor, is expressed as milligrams per gram (mg $g^{-1}$).

Figure 8:
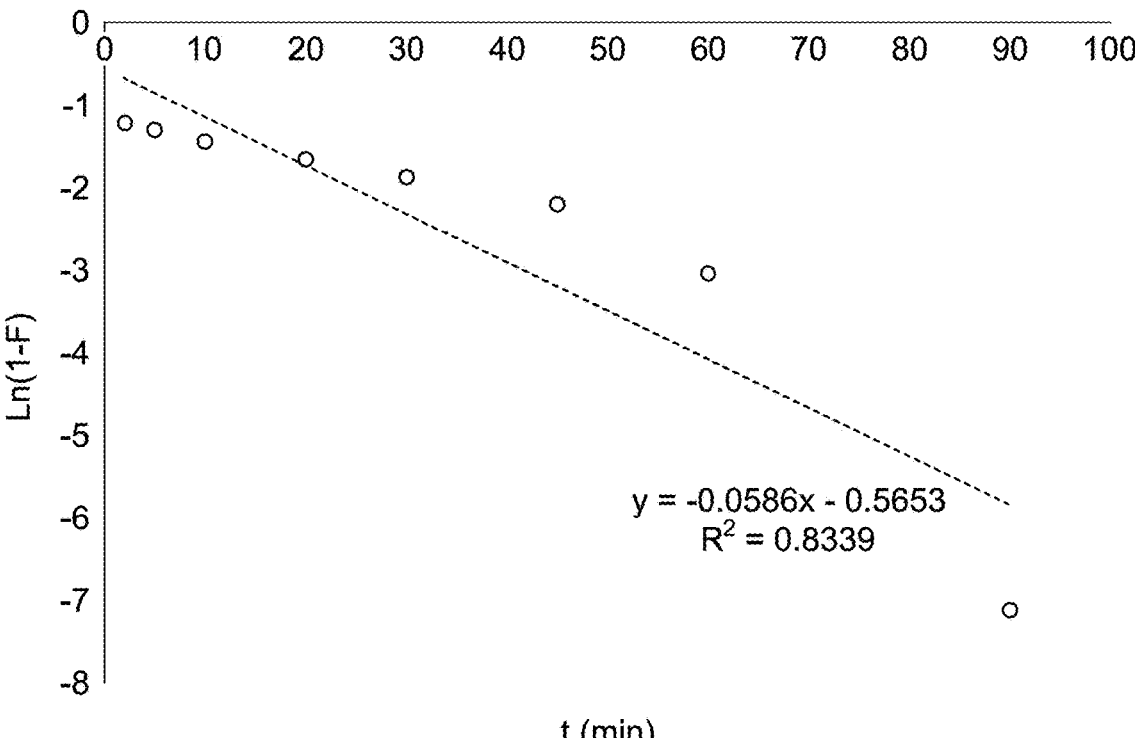
FIG. 8 is a graph of the liquid film diffusion (LFD) examination of Basic fuchsine (BF) sorption onto the $CaMoO_4/CaSiO_3/g\text{-}C_3N_4$ nanocomposite, according to certain embodiments.
Figure 9:
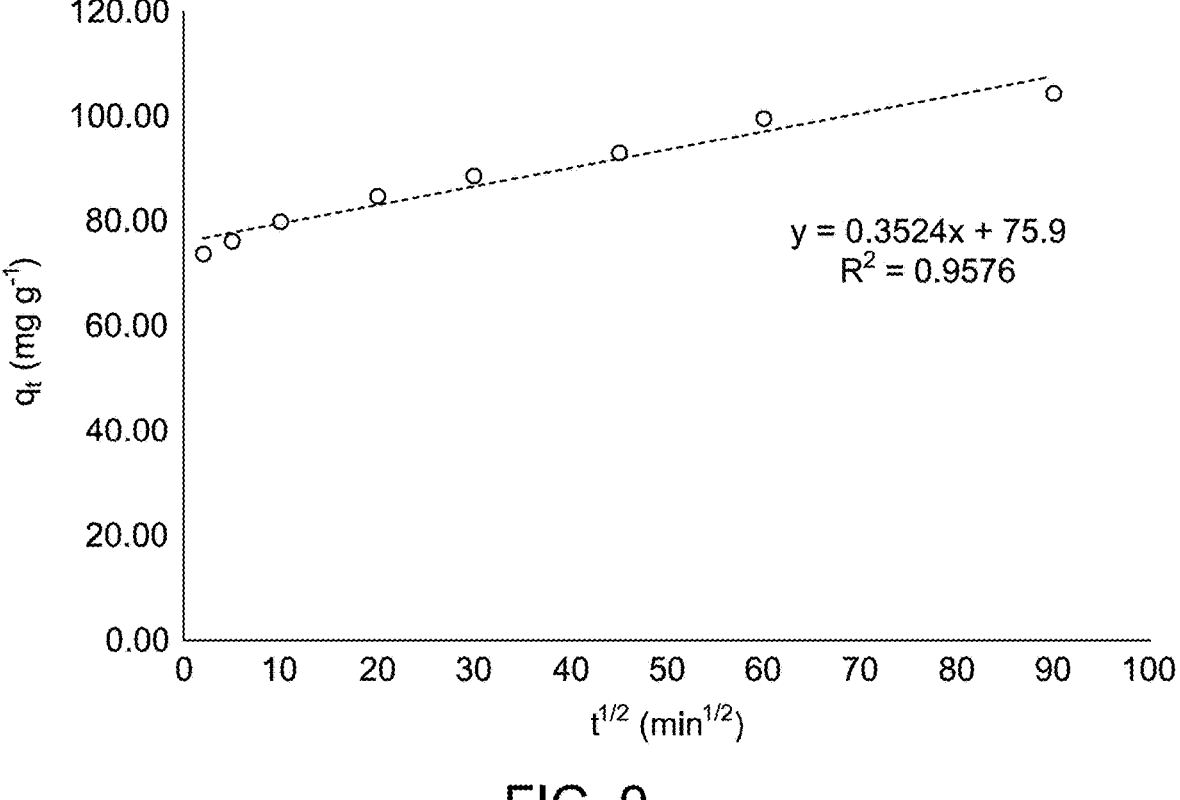
FIG. 9 is a graph of the intraparticle diffusion (IPD) examination of Basic fuchsine (BF) sorption onto a $CaMoO_4/CaSiO_3/g\text{-}C_3N_4$ nanocomposite, according to certain embodiments.

The LFD plot of the BF adsorption onto $CaMoO_4/CaSiO_3/g-C_3N_4$ nanocomposite, as shown in FIG. 8. Furthermore, as shown in FIG. 9, the IPD plots of BF sorption onto $CaMoO_4/CaSiO_3/g-C_3N_4$. The rate-control output of BF removal demonstrated that the IP controlled the sorption on the fabricated $CaMoO_4/CaSiO_3/g-C_3N_4$ nanocomposite.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of immobilizing contaminants disposed in an aqueous medium, the method comprising:
    contacting the aqueous medium with a particulate crystalline nanocomposite for a sufficient contact time to permit adsorption of the contaminants, the particulate crystalline nanocomposite comprising:
    a tetragonal $CaMoO_4$ crystalline phase;
    a $CaSiO_3$ crystalline phase; and,
    a graphitic-$C_3N_4$ crystalline phase,
wherein at least a fraction of the graphitic-$C_3N_4$ is in the form of mesoporous nanosheets,
    further comprising preparing the particulate crystalline nanocomposite by:
        forming a solution of a calcium salt and an alkali metal silicate in a solvent comprising water and a $C_1$-$C_4$ alkanol;
        heating the solution at a temperature of from about 150 to about 250° C. to form a dry product of $CaSiO_3$;
        forming graphitic-$C_3N_4$ by heating urea in a closed vessel at a temperature of about 500 to about 700° C.;
        forming an acidified solution in a polar protic solvent of a molybdenum salt and a reducing sugar;
        heating the acidified solution at a temperature of from about 150 to about 250° C. for a sufficient duration to carbonize the reducing sugar to form a carbonized product;
        comminuting the carbonized product of the heating stage;
        calcining the comminuted carbonized product at a temperature of from about 500 to about 1200° C. for a duration of from about 1 to about 5 hours to form $MoO_3$;
        dispersing the $CaSiO_3$, graphitic-C $N_4$ and $MOO_3$ in a polar protic solvent and heating the dispersion at a temperature of from about 150 to about 250° C. at a pressure of from about 2 to about 8 Bar; and,
        separating the solid particulate crystalline nanocomposite from the heated dispersion to form the particulate crystalline nanocomposite.

2. The method according to claim 1, wherein the contaminants comprise organic contaminants selected from the group consisting of polyaromatic hydrocarbons and their halogenated derivatives: phenols and their halogenated derivatives: furanes and their halogenated derivatives: dioxines and their halogenated derivatives: biphenyls and their halogenated derivatives; and, organic dyes.

3. The method according to claim 1, wherein the contaminants comprise inorganic contaminants selected from the group consisting of radioactive nuclides; toxic metals: heavy metals; and, metalloids.

4. The method according to claim 1, wherein the ratio by weight of $CaMoO_4$ to $CaSiO_3$ to graphitic-$C_3N_4$ in the particulate crystalline nanocomposite is about (0.8-1.2): (0.8-1.2):(0.8-1.2).

5. The method according to claim 1, wherein at least a fraction of the $CaMoO_4$ and at least a fraction of the $CaSiO_3$ of the particulate crystalline nanocomposite are in the form of substantially spherical particles.

6. The method according to claim 5, wherein:

at least 50 wt. % of the $CaMoO_4$ of the particulate crystalline nanocomposite is in the form of substantially spherical particles; and and at least 50 wt. % of the $CaSiO_3$ of the particulate crystalline nanocomposite is in the form of substantially spherical particles.

7. The method according to claim 5, wherein the substantially spherical particles have a median volume particle size (Dv50) of from about 5 to about 20 nm, as determined by Scanning Electron Microscopy.

8. The method according to claim 1, wherein at least 80 wt. % of the graphitic-$C_3N_4$ is in the form of mesoporous nanosheets.

9. The method according to claim 1, wherein the particulate crystalline nanocomposite has a monomodal pore size distribution, as determined by Barrett-Joyner-Halenda (BJH) desorption analysis.

10. The method according to claim 1, wherein the particulate crystalline nanocomposite has an average pore diameter of from about 15 to about 25 nm, as determined by BJH desorption analysis.

11. The method according to claim 1, wherein the particulate crystalline nanocomposite has an average pore diameter of from about 15 to about 20 nm, as determined by BJH desorption analysis.

12. The method according to claim 1, wherein the particulate crystalline nanocomposite has a surface area of from about 60 to about 100 m$^2$/g, as determined by Brunauer-Emmett-Teller (BET) analysis.

13. The method according to claim 1, wherein the particulate crystalline nanocomposite has a surface area of from about 70 to about 90 m$^2$/g, as determined by BET analysis.

14. The method according to claim 1, wherein the particulate crystalline nanocomposite has a pore volume of from about 0.1 to about 0.5 cm$^3$/g, as determined by BJH desorption analysis.

15. The method according to claim 1, wherein the contact time is from about 1 to about 120 minutes.

16. The method according to claim 1, wherein the contact time is from about 5 to about 30 minutes.

17. The method according to claim 1, wherein a fixed volume of the aqueous medium is provided in which the particulate crystalline nanocomposite is dispersed.

18. The method according to claim 1, wherein a flow of the aqueous medium contacts a membrane in which the particulate crystalline nanocomposite is disposed.

19. The method according to claim 1, wherein the particulate crystalline nanocomposite is provided in an amount of from about 0.1 to about 5 grams per liter of the aqueous medium.

\* \* \* \* \*